INVENTOR.
CHANDLER WENTWORTH
BY
ATTORNEY

Patented Nov. 14, 1950

2,529,719

UNITED STATES PATENT OFFICE 2,529,719

HIGH DIELECTRIC MATERIALS AND METHOD OF PRODUCING THEM

Chandler Wentworth, Princeton, N. J., assignor to Radio Corporation of America, a corporation of Delaware Application September 20, 1947, Serial No. 775,189

15 Claims. (Cl. 25—157)

This invention relates to new and improved high dielectric ceramic materials having especially high dielectric constants; and a method of producing them.

The improved ceramic dielectrics of this novel invention are particularly adapted to electrical capacitors and filter elements, although not specifically limited thereto.

An object of the invention is to provide an improved ceramic material of earth titanates, with a dielectric constant in excess of 10,000 and with a power factor not in excess of 50%.

Ceramic dielectric materials containing alkaline earth titanates and produced according to the prior art methods generally have dielectric constants up to 10,000. These prior art dielectrics have been made by firing the green ceramic bodies in oxidizing or uncontrolled furnace atmospheres at temperatures ranging from 2300° F. to 2700° F. According to my invention, I have found that many ceramic bodies can be fired in a reducing or controlled furnace atmosphere with the result of greatly improving the electrical stability and also increasing the dielectric constant thereof.

An improved feature of this invention is that when the dielectric constant has been increased above a K of 10,000, the physical volume of an electrical device employing these dielectrics is substantially reduced. Also, the dielectric constant of this improved ceramic material has been found to be more stable at the normally operating temperatures of electrical capacitors.

This invention will best be understood by referring to the accompanying drawings, wherein.

Figure 1:
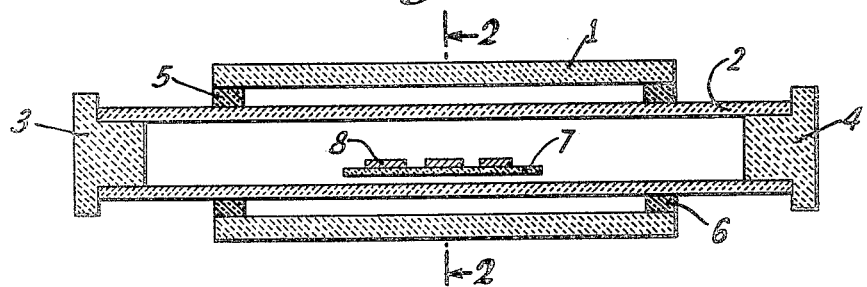
Fig. 1 is a longitudinal section of the apparatus employed to produce high dielectric constant materials.
Figure 2:
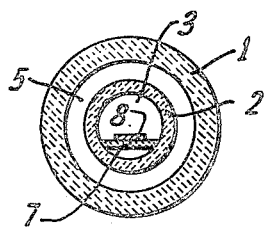
Fig. 2 is a cross-section of Fig. 1, on line 2—2.

Referring now to the drawings, the apparatus for firing the ceramic discs includes a muffle 1 which is of a standard type employed in electric furnaces generally. Within the muffle 1 there is placed a long graphite tube 2 having ceramic end plugs 3 and 4. The graphite tube 2 is sealed within the muffle by means of sealing rings 5 and 6. Located within the graphite tube, preferably positioned in the central portion thereof, is a suitable sagger 7. A suitable sagger for firing the ceramic materials of this invention is preferably made of pure zirconium oxide. The sealing rings are preferably made of fire brick material; or, if desired, the tube may be hermetically sealed with a refractory cement. Located on the top portion of sagger 7 are, for example, a plurality of ceramic dielectric discs 8 to be produced in accordance with this invention. These discs are generally used for electrical capacitors wherein a very high dielectric constant is desired for the ceramic material. Other ceramic bodies of different sizes and shapes may be similarly prepared.

The composition which I have found to be most satisfactory in order to produce a high dielectric constant ceramic material for the discs 8 and which will have a constant in excess of 10,000 and with a power factor not in excess of 50%, comprises a percentage of 72% barium and 28% strontium titanate. Other variations in percentages may be empolyed to increase the dielectric constant of ceramic materials from a range of 5000 to 25,000. For example, I have also employed some of the following materials: Barium titanate 95% and antimony trioxide 5%; barium titanate 95% and antimony pentoxide 5%; barium titanate 80% and barium stannate 20%; barium titanate 72% and zirconium oxide 28%; barium strontium titanate 80% and zirconium oxide 20%; and barium titanate 80% and antimony trioxide 20%.

The selected ceramic powder composition is then prepared for moulding by being mixed with one-half of one percent of methyl cellulose (400 C. P. S.) which acts as a temporary binder and lubricant. This combined powder and binder is next placed in a small steel mould approximately three-eighths inch in diameter and pressed to a thickness of 20 mils. These are given only as examples as other shapes and dimensions can be used with good results. A pressure of about 7500 pounds is applied to the discs 8, which produces a green ceramic body which is capable of handling without breakage. The discs 8 are then ready to fire in an electric furnace in a selected and controlled atmosphere.

The firing process, according to my invention, is to produce a selected reducing or carbon monoxide (CO) atmosphere within the graphite tube 2 by bringing the temperature within the electric furnace up to a desired temperature range of 2300° F. to 2700° F. The sagger 7 with the green dielectrics 8 are inserted in tube 2 and the ends sealed by plugs 3 and 4. The tube 2 is then placed in muffle 1 and sealed by rings 5 and 6, and allowed to soak in the reducing atmosphere of tube 2 within the electric furnace for the desired time of approximately five minutes to one hour (depending upon the type and physical composition of ceramic being fired and the dielectric constant required) at a temperature of approximately 2400° F. When the discs are fired as above, the constant K will be approximately 200,000. I have found that when a lower dielectric constant is desired, the ceramic bodies 8 can be fired in an atmosphere of hydrogen at the above mentioned operating temperatures. When hydrogen is employed, the dielectric constant of the ceramic bodies will be in the order of 150,000.

I have also found it desirable for a still lower K to pre-fire the green ceramic bodies 8 in air or an atmosphere of oxygen ($O_2$) with a temperature range of 2300° F. to 2700° F. for approximately five minutes, followed by a five minute firing in a reducing atmosphere. When the dielectric bodies have been pre-fired as above, the dielectric constant of the material will be found to be much lower, for example in the order of 25,000.

The proper atmosphere for producing high dielectric constant ceramics from any of the above mentioned ceramic compositions can be reached in many other ways which are thoroughly understood by those skilled in the art.

After firing in the furnace, the ceramic dielectrics 8 are then moved over from the central portion of the tube to one of the cool ends of the tube near the ceramic plugs 3 or 4. The ceramic bodies and sagger are then allowed to cool in this position without removing the ceramic plugs. After the ceramic bodies 8 have been sufficiently cooled, silver electrodes are then fired to the major surfaces of the ceramic dielectric discs in the manner known to those skilled in the capacitor art.

Any of the above mentioned ceramic compositions which are processed according to this invention will produce high dielectric constant ceramic discs which will have a constant in excess of 10,000 and will be found to have a power factor not in excess of 50%.

The firing of the ceramics by the method of this invention will produce an improved ceramic body which not only will increase the dielectric constant from the usual order of 500 up to a range of 250,000 but will also be found to be very stable, thus providing an improved dielectric which can be employed to produce a capacitor or filter element having a very large electrical capacity with a minimum of physical volume, which type of capacitor will require a minimum of space. Furthermore, the improved dielectrics of this invention will be found to produce a dielectric which is more stable as to electrical capacity with the normal operating temperatures than those of the same composition which is fired in air.

It is to be noted that the firing time in the reduced or controlled atmosphere is substantially short. For example, approximately five minutes is recited as the minimum amount. Therefore, in order to obtain the improved desired results, it is necessary that the firing time be kept to the minimum amount necessary to produce the desired result, as will be explained by the circuit shown in Fig. 3.

I have found that the capacitor dielectric disc of this invention is the electrical equivalent of a filter circuit including a capacitor C connected in shunt with a resistance $R_2$, in a series resistance $R_1$ connected with the shunt combination of the resistance and capacitor.

Figure 3:
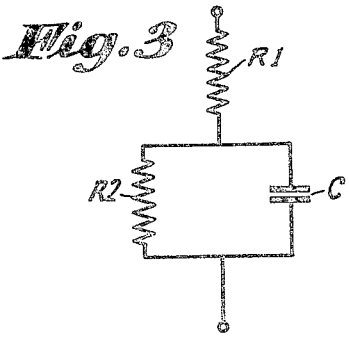
Fig. 3 is a circuit diagram explaining the theory of operation of this invention.

The shunt capacitor C represents an ideal capacitor, and, according to the formula $R_2 > X_c$: If the shunt resistance $R_2$ of Fig. 3 is low, and the series resistance $R_1$ is low, the power factor of the actual capacitor will be high. If the shunt resistor $R_2$ is large and if the series resistance $R_1$ is low the power factor of the actual capacitor will be found to be low. If $R_2$ is large and $R_1$ is also large, the power factor of the actual capacitor will be found to be high. With the ceramic disc of the capacitor placed in the reducing atmosphere for a relatively short time, as mentioned above, $R_1$ will be maintained low and $R_2$ will then be high, provided that the time in processing the ceramic dielectric in the reducing atmosphere is not carried too far. A low power factor is desired for a good capacitor. The subsequent firing of the ceramics in an atmosphere of air increases $R_1$ and $R_2$ and thus causes an increase in power factor. It will be seen that if the firing of the dielectrics is carried too far it will produce unsatisfactory results. Therefore, care must be exercised in selecting and controlling the proper firing atmosphere and proper time element.

What is claimed is:

1. A method of making a ceramic body characterized by having a dielectric constant higher than 10,000 comprising firing a molded body comprising a mixture of barium and strontium titanates in a reducing atmosphere for from about 5 minutes to about 1 hour at a temperature of 2,300°–2,700° F.

2. A method according to claim 1 in which said firing temperature is about 2,400° F.

3. A method according to claim 1 in which said mixture comprises 72% barium titanate and 28% strontium titanate.

4. A method of making a ceramic body characterized by having a dielectric constant higher than 10,000 comprising firing a molded body of a ceramic mixture which includes a major proportion of barium titanate in a reducing atmosphere for from about 5 minutes to about 1 hour at a temperature of 2,300°–2,700° F.

5. A method according to claim 4 in which said mixture includes an oxide of antimony.

6. A method according to claim 4 in which said mixture includes barium stannate.

7. A method according to claim 4 in which said mixture includes zirconium oxide.

8. A method of making a ceramic body characterized by having a dielectric constant higher than 10,000 comprising firing a molded body of a ceramic mixture comprising a major proportion of barium strontium titanate and a minor proportion of zirconium oxide in a reducing atmosphere for from about 5 minutes to about 1 hour at a temperature of 2,300°–2,700° F.

9. A ceramic body characterized by having a dielectric constant higher than 10,000, said body being the reaction product produced by firing a molded body comprising a ceramic mixture of which a major proportion is barium titanate in a reducing atmosphere for from about 5 minutes to about 1 hour at a temperature of 2,300°–2,700° F.

10. A body according to claim 9 in which said mixture includes also strontium titanate.

11. A body according to claim 10 in which said mixture comprises 72% barium titanate and 28% strontium titanate.

12. A body according to claim 9 in which said mixture includes also an oxide of antimony.

13. A body according to claim 9 in which said mixture includes zirconium oxide.

14. A body according to claim 9 in which said mixture includes barium stannate.

15. A ceramic body characterized by having a dielectric constant higher than 10,000, said body being the reaction product produced by firing a molded body comprising the reaction product of a ceramic mixture consisting of barium strontium titanate and zirconium oxide for from about 5 minutes to about 1 hour at a temperature of 2,300°–2,700° F.

CHANDLER WENTWORTH.

REFERENCES CITED

The following references are of record in the file of this patent:

UNITED STATES PATENTS

| Number | Name | Date |
|---|---|---|
| 2,091,569 | Ridgway et al. | Aug. 31, 1937 |